(12) United States Patent
Skibinski et al.

(10) Patent No.: US 7,500,522 B2
(45) Date of Patent: Mar. 10, 2009

(54) FLUID WITH ASPHALTENE CONTROL

(75) Inventors: Dan Skibinski, Calgary (CA); Clayton Smith, Edmonton (CA)

(73) Assignee: Innovative Chemical Technologies Canada Ltd., Calgary (CA)

( * ) Notice: Subject to any disclaimer, the term of this patent is extended or adjusted under 35 U.S.C. 154(b) by 186 days.

(21) Appl. No.: 11/534,064

(22) Filed: Sep. 21, 2006

(65) Prior Publication Data

US 2007/0062698 A1 Mar. 22, 2007

Related U.S. Application Data

(60) Provisional application No. 60/596,409, filed on Sep. 21, 2005.

(51) Int. Cl.
*E21B 37/06* (2006.01)
*E21B 43/26* (2006.01)

(52) U.S. Cl. .................. 166/304; 166/279; 166/300; 166/308.2; 166/310; 166/312; 166/369; 175/65

(58) Field of Classification Search ................. None
See application file for complete search history.

(56) References Cited

U.S. PATENT DOCUMENTS

| 5,073,276 A | 12/1991 | Newlove et al. |
| 5,388,644 A | 2/1995 | Romocki |
| 5,504,063 A | 4/1996 | Becker et al. |
| 6,313,367 B1 | 11/2001 | Breen |

*Primary Examiner*—Zakiya W. Bates
(74) *Attorney, Agent, or Firm*—Sean W. Goodwin; Linda M. Thompson

(57) ABSTRACT

Asphaltene control additives are added to base fluids which are introduced directly or indirectly into a hydrocarbon-bearing formation to mitigate asphaltene deposition in the formation which results in improved permeability in the formation and production of hydrocarbons therefrom. The fluids to which the additive is added may be liquid $CO_2$-based, aqueous-based or non-aqueous-based fluids. Further, the fluids are fracturing fluids, drilling fluids and wellbore treatment fluids such as acidizing fluids.

21 Claims, No Drawings

FLUID WITH ASPHALTENE CONTROL

CROSS REFERENCE TO RELATED APPLICATIONS

This application is a regular U.S. Patent application claiming priority of pending U.S. Provisional Patent application Ser. No. 60/596,409 filed Sep. 21, 2005, the entirety of which is incorporated herein by reference.

FIELD OF THE INVENTION

Embodiments of the invention relate to fluids, including non-aqueous fluids, aqueous fluids and liquid $CO_2$, which are injected into or otherwise enter hydrocarbon-bearing formations and more particularly, to hydraulic fracturing fluids, treatment fluids and drilling fluids containing additives for controlling asphaltene deposition, typically resulting from incompatibility between the introduced fluids and the native hydrocarbon in the formation.

BACKGROUND OF THE INVENTION

Asphaltene fractions are conventionally defined as the portion of crude oil or bitumen which precipitates on addition of a low molecular weight paraffin, typically n-pentane or n-heptane, but which is soluble in toluene. Asphaltenes are amorphous solids having a complex structure formed of condensed aromatic nuclei associated with alicyclic groups and involve carbon, hydrogen, nitrogen, oxygen and sulfur. The asphaltene particles are typically surrounded by naturally occurring resins which are thought to provide some dispersion stability.

Asphaltenes are typically present in crude oils and are largely stable in their native formation. Crude oil is conventionally described as a colloidal system which is stabilized to some extent by the naturally occurring resins which act as peptizing agents. Changes in pressure, temperature and phase composition however may result in destabilization and deposition, such as precipitation, of the asphaltenes in the formation. Such deposition may have catastrophic effects on the recovery of the crude from the formation. Destabilization and deposition of the aggregated asphaltene particles on the surface of, or in the pores in, the reservoir results in a loss of permeability and often significant reduction in production therefrom. Once blocked, efforts to remove the deposited asphaltene, using solvents such as toluene and the like, may be only minimally successful, are costly and present environmental hazards.

Fluids, including non-aqueous hydrocarbon or synthetic fluids or mixtures thereof, aqueous fluids and liquid $CO_2$ which are used in the petroleum industry may enter the reservoir through injection, such as in hydraulic fracturing, or may leak into the reservoir during drilling and the like. The presence of fluids, into the reservoir, whether injected or leaked, is understood in the industry to be problematic as the balance between the constituents of the native crude is readily upset, leading to asphaltene deposition. It is generally taught in the industry to avoid the use of a large variety of additives to fluids which are used directly in the formation or which may enter the formation, as it is thought that the nature of many additives, including those conventionally used for asphaltene control in already produced fluids, may lead to asphaltene deposition and the resultant damage to the formation. Further, it is also thought to be highly problematic to use fluids which contain aliphatics as the industry believes that aliphatics will also cause formation damage though asphaltene deposition.

Hydraulic fracturing of a reservoir is a production stimulation technique which utilizes volumes of fluid flowed into the reservoir, typically under pressure. Some fracturing fluids contains a proppant, such as sand, to support opened fractures within the reservoir to increase the permeability therein. A formation may be subjected to hydraulic fracturing techniques at the beginning of its production life or may be fractured one or more times later when readily available hydrocarbons have been removed and production begins to decrease or the reservoir is thought to be damaged. The influx of said hydraulic fracturing fluids into the wellbore may upset the nature of the colloidal system and result in the deposition of asphaltenes depending upon the nature of the crude, the characteristics of the reservoir and the nature of the fluids used for fracturing.

Conventional fracturing fluids typically contain few additives. Those additives which are typically added are generally only used to control the viscosity of the fluid, such as a gelling agent, which causes the viscosity of the fluid to increase so that proppant is retained in the fluid during fracturing. Typically, the fluids are designed to "break" or revert to a less viscous fluid following fracturing so as to deposit the proppant therein for keeping the fractures open during production. Cross-linking agents and breaking agents are added to help formation of the gel and breaking of the gel when so desired.

It is well known in the industry to use aromatic fluids, or fluids that have a relatively high aromatic content, as fracturing fluids. Typically, asphaltenes are more readily dispersed in aromatic fluids and therefore thought to be less likely to affect the permeability of the formation. Aromatic fluids suitable for this purpose generally contain large amounts of benzene, toluene and xylene (BTEX) or polycyclic aromatic hydrocarbons (PAH) which are carcinogenic and environmentally hazardous. Thus, it is desirable, when possible, to find alternatives to the use of significant amounts of aromatics when fracturing. This is particularly true in the case of sensitive off-shore environments.

Use of more environmentally friendly aliphatic fluids or blends of aromatic and aliphatic fluids containing large portions of aliphatics to replace fluids containing largely aromatics is, as previously stated, generally regarded in the industry to be problematic, as aliphatic fluids typically initiate deposition of asphaltene when in contact with native crude oils in the formation.

Applicant is aware that in some cases, even with conventional fracturing fluids, that the industry recommends performing core sample tests prior to fracturing on each and every formation to ensure that the fracturing fluid is compatible with the unique formation. Testing of this nature is time consuming and relatively expensive and delays production.

Liquid $CO_2$, which can be used for fracturing and the like, has a number of advantages, such as its ability to break down carbonaceous formations as well as its ability to be injected in the liquid state and return to a gaseous state near surface. The industry however is reluctant to use $CO_2$ as it is thought, in many cases, to enhance asphaltene deposition within the formation and reduce production therefrom.

Thus, there is much interest in the industry for the development of environmentally friendly fluids such as fracturing fluids and drilling fluids which minimize asphaltene deposition while at the same time avoiding interfering with the function and effectiveness of other fluid additives such as conventional gelling, cross-linking and breaking agents. Further, there is an interest in finding fluids that can be universally applied to any formation without the need to perform specialized and expensive testing at each wellsite.

SUMMARY OF THE INVENTION

A novel use for asphaltene additives and novel fluids which result therefrom for use are provided where fluids, used for fracturing, drilling or treatment of a wellbore or formation, may come into contact with a hydrocarbon-bearing formation for mitigating formation damage therein by substantially inhibiting the deposition of asphaltene in the formation.

Despite conventional understanding in the industry that asphaltene control additives, which are known for use in produced fluids and post-production handling of crude oils, are not suitable for use in a hydrocarbon-bearing formation, Applicant has found that the addition of said additives results in a mitigation of damage as a result of inhibition of asphaltene deposition therein. Further the addition of one or more of said additives permits the use of fluids, such as aliphatic fluids and aqueous fluids alone or in combination with aromatic fluids, which were heretofore thought to result in asphaltene deposition and formation damage.

One or more conventional asphaltene control additives are added to fluids which are introduced, directly or indirectly, to the formation despite the conventional understanding that the addition of additives, in general, causes asphaltene desposition. Use of these conventional additives enhances the use of liquid $CO_2$, aliphatic and aqueous based fluids generally thought to be problematic for causing asphaltene deposition in hydrocarbon-bearing formations. The addition of asphaltene control additive according to embodiments reduces or eliminates the need to obtain core samples prior to drilling or stimulating production.

In a broad aspect of the invention, a process for inhibiting asphaltene deposition in a hydrocarbon-bearing formation when introducing fluids into the hydrocarbon-bearing formation comprises: adding an effective amount of one or more asphaltene control additives to a base fluid for forming a fluid; and introducing the fluid to the formation, wherein when the fluid contacts hydrocarbons in the hydrocarbon-bearing formation, the one or more asphaltene control additives substantially inhibit the deposition of asphaltene therein.

The base fluid can be liquid $CO_2$, aqueous fluid, aliphatic fluid aromatic fluid or combinations thereof and can be used in a variety of operations including, but not limited to, drilling, fracturing and treatment of wellbores and formations.

DETAILED DESCRIPTION OF THE PREFERRED EMBODIMENTS

Embodiments of the invention comprise a fluid which is either intentionally injected into the formation, such as a fracturing fluid, or fluids which are used in a wellbore, but which may leak into the formation during or after use to which one or more asphaltene additives are added.

The one or more asphaltene control additives may be selected from conventional asphaltene inhibitors and dispersants, typically used in post-production handling of produced fluids, such as crudes. Applicant believes the asphaltene inhibitors and dispersants act to control asphaltene deposition through a variety of mechanisms, which include, but are not limited to, mimicking of the naturally occurring resins in the crude and ionic dispersion of the asphaltene agglomerates. Examples of asphaltene control additives which may be used include polyolefin esters, maleic anhydride copolymers or terpolymers, aliphatic sulphonic moieties, and alky aryl sulphonic acid moieties and the like. Conventional asphaltene additives are added to a base fluid in an effective amount and typically to a range of between 0.01 L additive/$m^3$ of total fluid to about 100 L additive/$m^3$ total fluid. One of skill in the art would understand that there may be additional compatible additives which are suitable for use in the formation and therefore fall within the spirit of the invention.

These novel fluids permit the use of aqueous and aliphatic base fluids and avoids the initiation of asphaltene deposition conventionally thought to occur in the absence of an asphaltene control additive. Further, addition of asphaltene control additives according to embodiments of the invention utilizing aromatic base fluids result in improved permeability of the formation compared with aromatic fluids alone.

Advantageously, embodiments of the invention provide fluids which may be used universally in substantially all formations without the need for individualized core sample testing to ascertain compatibility. This is the case for fracturing fluids which are injected directly into the formation and drilling fluids which may leak into the formation during the drilling process.

Non-Aqueous Based Fluids

Fracturing Fluids

In one embodiment, a fracturing fluid comprises an asphaltene control additive which mimics the effect of the naturally occurring resin in the formation to minimize the deposition of asphaltene into the formation when the fracturing fluid comes into contact with crude oil contained therein. In this embodiment, the additive comprises a high molecular weight polyolefin ester being in the range of about $C_{28}$ to about $C_{250}$ and mixtures thereof.

In one embodiment, the polyolefin ester is diluted in a solvent to comprise from about 20% to about 40% forming a diluted additive mixture for ease of transport and addition to the base fluid. The diluted additive mixture is readily transported to the field for addition to the fracturing fluids at the site or can be added to the fracturing fluid prior to delivery to the site. The solvent in which the additive is diluted may be an aliphatic, an aromatic or a combination thereof.

The base fluid is non-aqueous, hydrocarbon-based or synthetic, liquid $CO_2$ or mixtures thereof and, in one embodiment, is aliphatic in nature, but may be aromatic or a combination of aliphatic and aromatic fluids. The fracturing fluid of this embodiment is treated with a polyolefin ester additive, in the range of about $C_{28}$ to about $C_{250}$ and mixtures thereof, to a range of between 0.1 L additive/$m^3$ of total fluid to about 100 L additive/$m^3$ total fluid (30-30,000 ppm active polyolefin ester), but is most preferably treated to a range of about 1 L/$m^3$ to about 10 L/$m^3$ (300-3000 ppm active polyolefin ester).

Alternatively, the polyofelin ester additive may be added directly to the total volume of the fracturing fluid without preparation of the diluted additive mixture and either the undiluted active additive or the diluted additive mixture can be added to the fracturing fluid at any stage of the preparation of the fracturing fluid, prior to injection into the formation. For example, additive can be added during distillation, fractionation and storage of the fracturing fluid.

In one embodiment, the polyolefin esters and mixtures thereof do not contain nitrogen or nitrogen-containing groups to minimize other associated environmental hazards.

Conventionally, fracturing fluids comprise additional additives such as gelling agents, cross-linking agents and breaking agents which facilitate the increase in viscosity or gelling of the fracturing fluid to hold proppant during injection and fracturing and to return the fluid to a non-gelled, less viscous form for removal from the formation. Applicant has found that the addition of non-ionic asphaltene inhibitors or dispersants, such as large molecular weight polyolefin esters and maleic anhydride copolymers and terpolymers according to embodiments of the invention do not interfere with gelling and break times when conventional gelling, cross-linking and breaking agents are used. Use of ionically charged asphaltene control additives, such as aliphatic sulphonic moieties and alkyl aryl sulphonic acid moieties, while useful to inhibit asphaltene deposition are more likely to interfere with conventional gelling and breaking additives and are therefore less preferred for use in embodiments used as fracture fluids.

As shown in Table 1, in phase trap tests using cores containing crudes with high asphaltene content, the percentage regain in permeability was significantly higher with fracturing fluids using asphaltene inhibitor/dispersant additives according to embodiments of the invention when compared to treatment of the same cores using the base fluids without said additives.

Several different base oils were tested including base oils having no little or no aromatic content, such as ENVIROFRAC™, (available from Innovative Chemical Technologies Canada, Calgary, Alberta, Canada), and kerosene and those with some aromatic content, such as DISTILLATE 822™ having an aromatic content which varies from little or none to about 20% (available from Gibson's Energy Ltd, Calgary, Alberta, Canada) and FRAC CLEAR™ having an aromatic content estimated to be about 20% (available from Innovative Chemical Technologies Canada, Calgary, Alberta, Canada).

Alberta, Canada contained substantially no aromatics, OPTIMUM™ (available from Innovative Chemical Technologies Canada, Calgary, Alberta, Canada) contained about less than 1% aromatics, STARFRAC™ (available from Innovative Chemical Technologies Canada, Calgary, Alberta, Canada) contained about 6% aromatics and FRACCLEAR™ (available from Innovative Chemical Technologies Canada, Calgary, Alberta, Canada) contained about 14% aromatics. The results are shown in Table 2, attached hereto.

TABLE 2

| Elapsed time (minutes) | Average Temp (C.) | N | K (*) | 40 mPas | 100 mPas | 170 mPas |
|---|---|---|---|---|---|---|
| Envirofrac ™ A contains substantially 0% aromatics ||||||||
| 0 | 16 | 0.2239 | 5.0056 | 286 | 140 | 93 |
| 5 | 31 | −0.0091 | 37.2694 | 901 | 357 | 209 |
| 10 | 41 | −0.0018 | 59.4764 | 1477 | 590 | 347 |
| 15 | 47 | −0.0484 | 85.2833 | 1783 | 682 | 391 |
| 20 | 51 | −0.0652 | 95.3540 | 1874 | 706 | 401 |
| 25 | 54 | −0.0575 | 97.6051 | 1974 | 749 | 427 |
| 30 | 57 | −0.0205 | 84.1469 | 1950 | 766 | 445 |
| 35 | 59 | 0.0018 | 74.3915 | 1872 | 750 | 442 |
| 40 | 61 | 0.0405 | 60.2899 | 1750 | 727 | 437 |
| 45 | 62 | 0.1012 | 43.1330 | 1566 | 687 | 427 |

TABLE 1

| | Fracture Fluid | | | | | | |
|---|---|---|---|---|---|---|---|
| | EnviroFrac ™ no additive | EnviroFrac ™ with additive AO6006 | EnviroFrac ™ with additive MD0507 | Distillate 822 ™ no additive | Distillate 822 ™ with additive AO6006 | FracClear ™ no additive | kerosene no additive |
| Core ID | 9A | 4 | 7 | 23A | 5 | 10A | 10 |
| $K_{air}$ (mD) | 45.1 | 21 | 19.7 | 25.8 | 17.6 | 43.5 | 26.5 |
| Porosity (%) | 14.7 | 14.5 | 7.1 | 11.0 | 13.4 | 15.2 | 10.2 |
| Test Temp (° C.) | 85 | 85 | 85 | 85 | 85 | 85 | 85 |
| Pore Pressure (kPa) | 20670 | 20670 | 20670 | 20670 | 20670 | 20670 | 20670 |
| Live oil viscosity (mPa · s) | 1.23 | 1.23 | 1.23 | 1.23 | 1.23 | 1.23 | 1.23 |
| Initial $K_{oil}$ at Swi | 22.1 | 12.9 | 11.2 | 22.8 | 9.59 | 30.2 | 13.6 |
| Permeability Regain (mD) | 17.6 | 12.4 | 11.2 | 19.3 | 9.59 | 28.6 | 12 |
| Percent regain permeability (%)* | 79 | 97 | 100 | 85 | 100 | 95 | 88 |

AO6006 and MD0507 - high molecular weight polyolefin esters, each containing a different mixture of polyolefin esters in the range of about C28 to about C250.

The tests illustrated herein were performed using two different additives AO6006 and MD0507, each of which comprises different mixtures of polyolefin esters in the ranges of $C_{28}$-$C_{250}$. One of skill in the art would understand that polyolefin ester additives according to embodiments of the invention may have many different combinations of polyolefin ester therein without departing from the basic inventive concept.

Cores tested with exposure to base fluids containing asphaltene control additives, regardless of the aromatic content or lack thereof in the base fluid, exhibited significant increases in permeability regain when compared to cores which were exposed to the base fluid alone.

Gel and break time testing was performed using a variety of base fluids having different aromatic content and two different asphaltene control additives A,B, according to embodiments of the invention, and labeled as A and B for each fluid tested eg. ENVIROFRAC A™ and ENVIROFRAC B™.

The fluids tested all contain conventional gellant, cross-linking and breaking additives. ENVIROFRAC™ (available from Innovative Chemical Technologies Canada, Calgary, TABLE 2-continued

| Elapsed time (minutes) | Average Temp (C.) | N | K (*) | 40 mPas | 100 mPas | 170 mPas |
|---|---|---|---|---|---|---|
| 50 | 62 | 0.2013 | 25.0515 | 1316 | 633 | 414 |
| 55 | 62 | 0.3588 | 10.9728 | 1031 | 573 | 408 |
| 60 | 62 | 0.5210 | 4.6957 | 802 | 517 | 401 |
| 65 | 62 | 0.6447 | 2.3615 | 637 | 460 | 381 |
| 70 | 61 | 0.7402 | 1.3359 | 512 | 404 | 352 |
| 75 | 61 | 0.8129 | 0.8560 | 429 | 362 | 327 |
| 79 | 60 | 0.8294 | 0.7344 | 391 | 335 | 306 |
| 84 | 60 | 0.8466 | 0.6308 | 358 | 311 | 287 |
| 89 | 60 | 0.8473 | 0.5834 | 332 | 289 | 266 |
| 94 | 59 | 0.8523 | 0.5343 | 310 | 271 | 250 |
| 99 | 59 | 0.8550 | 0.4932 | 289 | 253 | 234 |
| 104 | 59 | 0.8425 | 0.4886 | 273 | 237 | 218 |
| FracClear ™ A contains approximately 14% aromatics |||||||
| 0 | 20 | −0.2916 | 172.9350 | 1475 | 452 | 228 |
| 5 | 42 | 0.1636 | 36.9251 | 1688 | 784 | 503 |
| 10 | 49 | 0.5394 | 3.9853 | 729 | 478 | 374 |
| 15 | 52 | 0.7171 | 0.5689 | 200 | 155 | 133 |

TABLE 2-continued

| Elapsed time (minutes) | Average Temp (C.) | N | K (*) | 40 mPas | 100 mPas | 170 mPas |
|---|---|---|---|---|---|---|
| 20 | 55 | 0.5471 | 0.5304 | 100 | 66 | 52 |
| 25 | 57 | 0.5580 | 0.3061 | 60 | 40 | 32 |
| 30 | 59 | 0.5741 | 0.2082 | 43 | 29 | 23 |
| StarFrac ™ A contains approximately 6% aromatics | | | | | | |
| 0 | 35 | −0.1137 | 139.9162 | 2299 | 829 | 459 |
| 5 | 48 | 0.2584 | 21.8148 | 1415 | 717 | 484 |
| 10 | 53 | 0.6749 | 1.4061 | 424 | 315 | 265 |
| 15 | 55 | 0.5292 | 1.1710 | 206 | 134 | 104 |
| 20 | 56 | 0.4770 | 0.8848 | 129 | 80 | 60 |
| 25 | 58 | 0.4972 | 0.5657 | 89 | 56 | 43 |
| 30 | 59 | 0.5345 | 0.3609 | 65 | 42 | 33 |
| 35 | 60 | 0.4957 | 0.3743 | 58 | 37 | 28 |
| Optimum ™ A contains approximately less than 1% aromatics | | | | | | |
| 0 | 23 | −0.1035 | 82.8949 | 1415 | 515 | 287 |
| 5 | 42 | 0.2908 | 15.5168 | 1134 | 592 | 406 |
| 10 | 48 | 0.5913 | 0.9868 | 219 | 150 | 121 |
| 15 | 51 | 0.6002 | 0.4171 | 95 | 66 | 54 |
| 20 | 54 | 0.6569 | 0.1830 | 52 | 38 | 31 |
| 25 | 57 | 0.6576 | 0.1234 | 35 | 26 | 21 |
| Frac Clear ™ B contains approximately 14% aromatics | | | | | | |
| 0 | 16 | −0.3566 | 112.1336 | 752 | 217 | 106 |
| 5 | 38 | 0.1353 | 43.8703 | 1807 | 818 | 517 |
| 10 | 46 | 0.6122 | 2.4510 | 586 | 411 | 335 |
| 15 | 50 | 0.5660 | 1.0845 | 219 | 147 | 117 |
| 20 | 54 | 0.5663 | 0.4992 | 101 | 68 | 54 |
| EnviroFrac ™ B contains substantially 0% aromatics | | | | | | |
| 0 | 21 | 0.2598 | 23.1283 | 1508 | 765 | 517 |
| 5 | 44 | 0.0499 | 53.6791 | 1613 | 675 | 408 |
| 10 | 54 | −0.0118 | 64.7481 | 1550 | 613 | 358 |
| 15 | 57 | 0.1146 | 29.1924 | 1114 | 495 | 309 |
| 20 | 58 | 0.3119 | 8.2514 | 652 | 347 | 241 |
| 25 | 58 | 0.4794 | 2.7781 | 407 | 253 | 192 |
| 30 | 58 | 0.5560 | 1.5778 | 307 | 204 | 161 |
| 35 | 59 | 0.5956 | 1.1444 | 257 | 178 | 143 |
| 40 | 59 | 0.6155 | 0.9298 | 225 | 158 | 129 |
| 45 | 59 | 0.6334 | 0.7755 | 201 | 143 | 118 |
| 50 | 59 | 0.6229 | 0.7498 | 187 | 132 | 108 |
| 55 | 59 | 0.6390 | 0.6427 | 170 | 122 | 101 |
| 60 | 59 | 0.6405 | 0.5891 | 156 | 112 | 93 |
| 65 | 60 | 0.6464 | 0.5336 | 145 | 105 | 87 |
| StarFrac ™ B contains approximately 6% aromatics | | | | | | |
| 0 | 17 | −0.1054 | 106.1386 | 1798 | 653 | 363 |
| 5 | 39 | 0.0180 | 77.5246 | 2071 | 842 | 500 |
| 10 | 48 | 0.4216 | 7.4269 | 879 | 518 | 381 |
| 15 | 52 | 0.5689 | 1.6146 | 329 | 222 | 176 |
| 20 | 55 | 0.4616 | 1.2765 | 175 | 107 | 80 |
| 25 | 57 | 0.5233 | 0.6011 | 104 | 67 | 52 |
| 30 | 59 | 0.5536 | 0.3641 | 70 | 47 | 37 |
| 35 | 61 | 0.5563 | 0.2735 | 53 | 35 | 28 |
| Optimum ™ B contains approximately less than 1% aromatics | | | | | | |
| 0 | 15 | −0.0132 | 25.7060 | 612 | 242 | 141 |
| 5 | 35 | 0.0457 | 41.5094 | 1228 | 512 | 309 |
| 10 | 44 | 0.5128 | 1.8828 | 312 | 200 | 154 |
| 15 | 48 | 0.3500 | 1.8746 | 170 | 94 | 67 |
| 20 | 51 | 0.6021 | 0.3937 | 91 | 63 | 51 |
| 25 | 54 | 0.7254 | 0.1383 | 50 | 39 | 34 |
| 30 | 57 | 0.7655 | 0.0788 | 33 | 27 | 24 |

Aqueous Based Fluids

In another embodiment, one or more conventional asphaltene additives are added to aqueous fluids introduced to the formation, either directly, such as in aqueous based fracturing fluids, or indirectly such as in drilling muds.

Typically, some conventional asphaltene control additives, such as the high molecular weight polyolefins, are not readily soluble in aqueous based fluids. In order to add insoluble or non-dispersing asphaltene control additives to aqueous based fluids, such as many drilling muds, aqueous-based fracturing fluids or to aqueous-based treatment fluids, such as acidizing fluids, and to ensure that the additive is delivered to the formation where inhibition of asphaltene deposition is desired, the asphaltene control additive is first micro-encapsulated using conventional micro-encapsulation techniques, similar to that taught in U.S. Pat. No. 5,073,276 to Newlove et al., and then added into the aqueous based fluid.

Alternatively, one could use other asphaltene control additives such as some of the sulphonic moieties which are soluble or dispersible in aqueous fluids, however being ionic in nature, it is preferred that such additives be used in aqueous base fluids where additional non-compatible additives, such as gel and break additives, are not present.

The material used to micro-encapsulate the asphaltene control additive is selected to effectively isolate the additive from the aqueous base fluid during delivery into the wellbore and ultimately to the formation or directly into the formation and thereafter release the additive to the formation for mitigating damage therein as a result of asphaltene deposition. Release of the additive may be time-delayed using a micro-encapsulation material that loses its integrity at a predetermined time following mixing with the aqueous based fluid. Release of the additive may be temperature dependant so as to release the additive only at predetermined temperatures such as those found in the formation, but preferably not in the wellbore or during delivery to the wellbore. Alternatively, and in one embodiment, the micro-encapsulation material is selected to be insoluble in the aqueous base fluid but is soluble in the hydrocarbons in the hydrocarbon-bearing formation. One such suitable micro-encapsulation material for hydrophobic asphaltene control additives may be an oil-soluble resins such as an aldehyde polycondensation resin.

In use therefore, the addition of asphaltene control additives permits the use of liquid $CO_2$, aqueous and non-aqueous base fluids, particularly aliphatic base fluids, directly in the formation while minimizing asphaltene deposition and damage thereto. Further, in the case of base fluids which contain some aromatics or which are aromatic in nature, the addition of asphaltene control additives further protects against asphaltene deposition and damage in the formation. Addition of the asphaltene control additives does not adversely affect the performance of convention gelling agents and breakers therein.

The embodiments of the invention in which an exclusive property or privilege is claimed are defined as follows:

1. A process for inhibiting asphaltene deposition in a hydrocarbon-bearing formation for minimizing loss of permeability therein when contacting a process fluid with at least some native hydrocarbons containing asphaltenes within the formation, the process comprising:
   providing a base fluid which would result in asphaltene deposition when contacted with the native hydrocarbon fluids containing asphaltenes; adding an effective amount of one or more asphaltene control additives to the base fluid for forming the process fluid; and
   introducing the process fluid to the formation prior to production of hydrocarbons from the formation,
   wherein when the process fluid contacts the native hydrocarbons in the hydrocarbon-bearing formation, the asphaltene control additive substantially inhibits the deposition of asphaltene within the formation.

2. The process of claim 1 wherein the base fluid is an aqueous fluid, a non-aqueous fluid, liquid $CO_2$ or mixtures thereof.

3. The process of claim 2 wherein the non-aqueous base fluid is an aliphatic fluid, an aromatic fluid or combinations thereof.

4. The process of claim 1 wherein the one or more asphaltene control additives are selected to at least mimic at least some native resins present in the at least some native hydrocarbons in the hydrocarbon bearing formation.

5. The process of claim 1 wherein the one or more asphaltene control additives comprise any one or more of polyolefin esters, maleic anhydride copolymers, maleic anhydride terpolymers, aliphatic sulphonic moieties and alky aryl sulphonic acid moities and mixtures thereof.

6. The process of claim 1 wherein the one or more asphaltene control additives is a high molecular weight polyolefin ester in a range of about $C_{28}$ to about $C_{250}$ and mixtures thereof.

7. The process of claim 6 wherein the high molecular weight polyolefin ester is in a range of about 0.1 L per cubic meter to about 100 L per cubic meter of a total volume of the fluid.

8. The process of claim 6 wherein the high molecular weight polyolefin ester is in a range of about 1 L per cubic meter to about 10 L per cubic meter of a total volume of the fluid.

9. The process of claim 6 wherein the high molecular weight polyolefin ester is in a range of 30 ppm to about 30,000 ppm of an active high molecular weight polyolefin ester.

10. The process of claim 6 wherein the high molecular weight polyolefin ester is in a range of 300 ppm to about 3000 ppm of an active high molecular weight polyolefin ester.

11. The process of claim 1 wherein the process fluid is a fracturing fluid.

12. The process of claim 1 wherein the process fluid is a drilling fluid.

13. The process of claim 1 wherein the process fluid is a well treatment fluid.

14. The process of claim 1 wherein the base fluid is an aqueous fluid, the process further comprising:
providing an effective amount of the one or more asphaltene control additives micro-encapsulated in a micro-encapsulation material which is insoluble in the aqueous fluid and soluble in the native hydrocarbons in the hydrocarbon-bearing formation; and
adding the effective amount of the one or more asphaltene control additives in the micro-encapsulation material to the aqueous base fluid for forming the fluid.

15. The process of claim 14 wherein the one or more asphaltene control additives are selected to at least mimic at least some of native resins present in the at least some native hydrocarbons in the hydrocarbon bearing formation.

16. The process of claim 14 wherein the one or more asphaltene control additives is a high molecular weight polyolefin ester in a range of about $C_{28}$ to about $C_{250}$ and mixtures thereof.

17. The process of claim 16 wherein the high molecular weight polyolefin ester is in a range of about 0.1 L per cubic meter to about 100 L per cubic meter of a total volume of the fluid.

18. The process of claim 16 wherein the high molecular weight polyolefin ester is in a range of about 1 L per cubic meter to about 10 L per cubic meter of a total volume of the fluid.

19. The process of claim 16 wherein the high molecular weight polyolefin ester is in a range of 30 ppm to about 30,000 ppm of an active high molecular weight polyolefin ester.

20. The process of claim 16 wherein the high molecular weight polyolefin ester is in a range of 300 ppm to about 3000 ppm of an active high molecular weight polyolefin ester.

21. The process of claim 14 wherein the micro-encapsulation material is an oil-soluble resin.

* * * * *